Patented Sept. 8, 1931

1,822,439

UNITED STATES PATENT OFFICE

WALTER HAHNEMANN, OF BERLIN-MARIENFELDE, GERMANY, AND KARL RATH, OF NEW YORK, N. Y., ASSIGNORS TO C. LORENZ AKTIEN GESELLSCHAFT, OF BERLIN-TEMPELHOF, GERMANY

ALTERNATING CURRENT SYSTEM

Original application filed March 17, 1928, Serial No. 262,461, and in Germany January 31, 1928. Divided and this application filed June 17, 1929. Serial No. 371,597.

This application which is a division of application Serial No. 262,461 to Karl Schmidt, Walter Hahnemann and Karl Rath, filed March 17, 1928, refers to alternating current electrical systems and is more particularly directed to such systems in which a current of a given frequency is to be introduced into a circuit system carrying currents of a different frequency, such as for instance, as is the case in a carrier current transmission over alternating current power lines for communication or distance control purposes.

The object of this invention is to provide coupling means whereby a carrier current may be introduced into a power system without reaction of the comparatively heavy power currents upon the delicate carrier current equipment.

Another object of this invention is to provide simple and effective means for producing a plurality of carrier currents introduced upon the power system by means of a single basic carrier frequency.

These and further objects of our invention in detail of construction and operation, will become apparent as the following detailed description proceeds, which is taken in conjunction with the appended drawings showing by way of example two circuit diagrams embodying our invention. It is understood that we do not wish to be limited to the practical examples as shown by the views of the drawings but that our invention is subject to many modifications coming within the broad spirit and scope of the appended claims.

Figure 1:
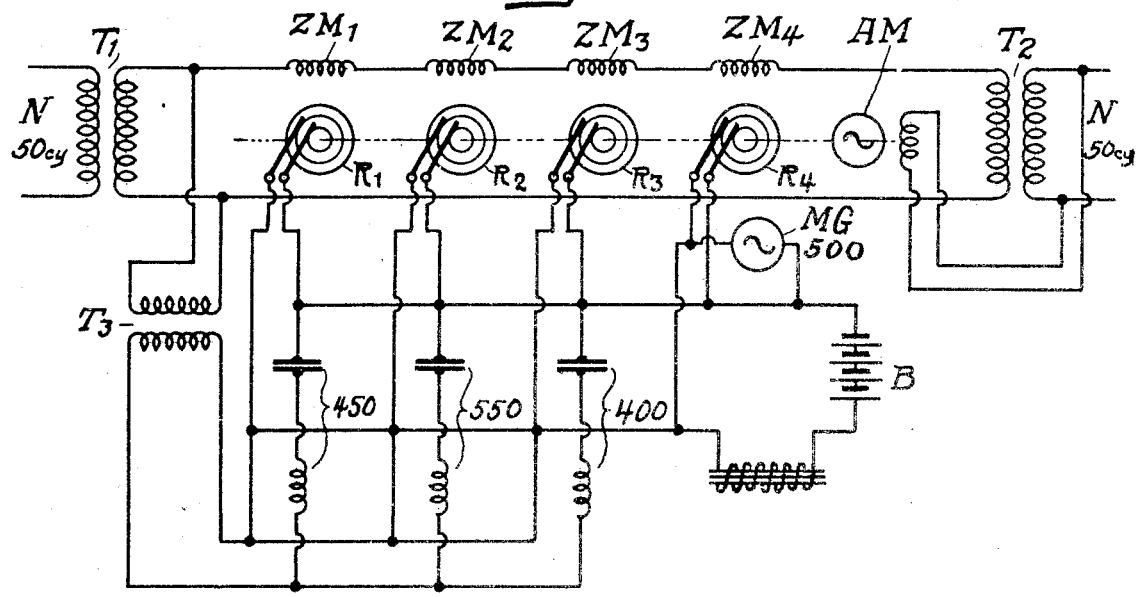

Figure 1 of the drawings shows an arrangement for introducing two or more intermediate frequencies into the same power line by using a single basic carrier frequency.

Figure 2:
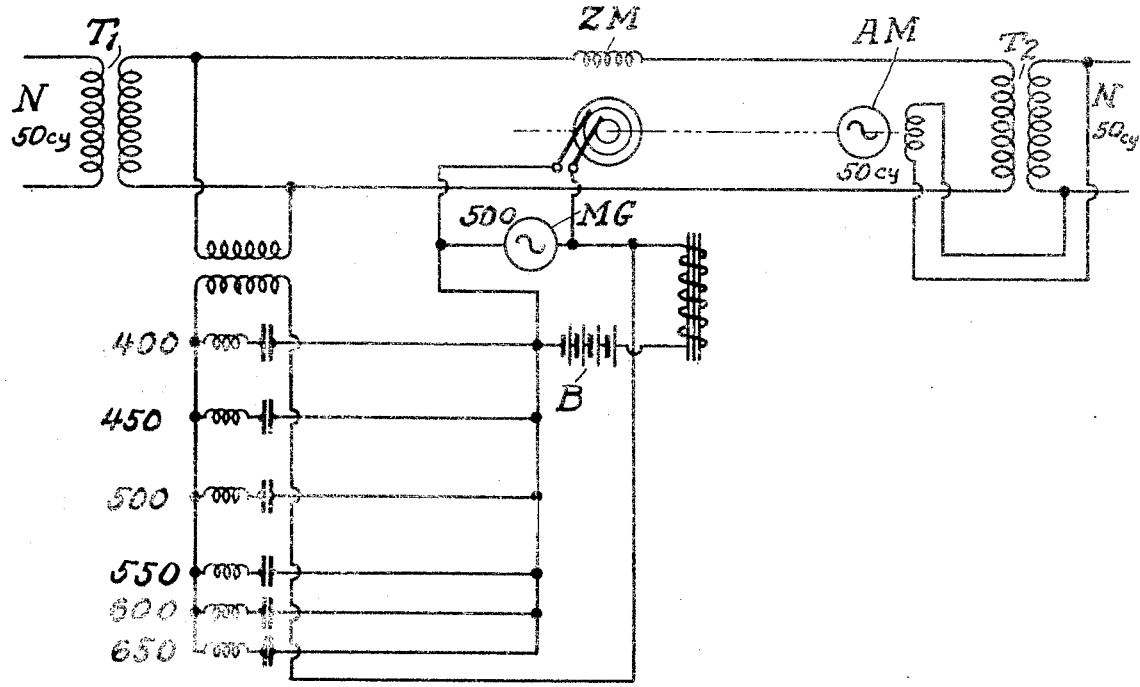

Figure 2 shows another circuit arrangement which constitutes a simplification as compared to the arrangement of Figure 1 for obtaining the same purpose.

In the above mentioned application, there is described a system in connection with electrical power net-works for introducing a carrier current into the net-work for the purpose of communication or distant control and the like. In electrical power networks, it is often desirable to effect switching movements at distant points of the network, for instance at consuming points from the generating station, sub-station or the like. For this purpose, it has been proposed to use currents of an intermediate frequency which are superimposed upon the power line and which serve to actuate a relay at the distant point, e. g., a frequency relay. Thus, by employing several such currents of different frequencies, different distant controlling movements may be effected. For instance, such distant control may serve to adjust electricity meters at the consuming points to different tariffs in accordance with the loading period of the power station, or they may serve to directly switch in or out distant consumers such as street lighting apparatus and the like. This invention has reference to all such arrangements where a distant control or signaling along power lines is required.

Furthermore, carrier currents of this type are used for communication purposes, such as telephone conversations.

The main difficulty which arises in systems of this kind consists in comparatively strong power currents entering into the more delicate carrier current apparatus, such as signalling and control equipment. A number of means have been proposed in order to prevent this drawback, such as compensating circuit arrangements or the use of blocking or rejector circuits and the like. All these improvements have been very ineffective in that compensating circuits are very difficult to adjust and to operate and in that the use of blocking or rejector circuits afford heavy and expensive electrical apparatus, such as condensers which render installation of this kind prohibitive in practice.

In the above mentioned application, a very simple and effective means has been proposed to overcome the above disadvantages. This consists in its broadest terms, in using an inductive coupling device having primary and secondary windings moving relative to each other with a synchronous speed in respect to the power frequency. In this manner, coupling in respect to the power current, is absolutely prevented, whereas for the carrier currents having a different frequency, an effective coupling connection is maintained. The most simple means of such a moving inductive connection, consists in the use of a synchronous machine such as a synchronous motor or generator, whereby the carrier currents are introduced into the existing or into an auxiliary exciting winding of the machine.

According to the present invention, this phenomenon is made use of to produce two or more signalling or controlling frequencies for transmitting different signals or effecting different distant controls. When employing a single machine, there will be two frequencies generated at first, as is seen from the above. In case however, that more than two different frequencies are required, it is a further object of this invention to provide a corresponding number of synchronous machines. The exciting currents of these machines are taken out of the power line and are of a frequency which has already been generated by the preceding machine. For this purpose, well-known filtering circuits may be employed.

Instead of using several machines, a single machine may be provided to produce any number of frequencies. The side or split frequencies produced in the stator are reintroduced into the exciter winding of the same machine for the purpose of producing further side frequencies, each differing by the amount of the power frequency (50 cycles) from the preceding exciting frequency. Thus, each further transfer between exciter winding and armature as desired will produce a new splitting up of the respective frequency.

Referring to Fig. 1, $T_1$ and $T_2$ represent two transformers arranged in a single phase network N. $ZM_1$, $ZM_2$, $ZM_3$ and $ZM_4$ are additional synchronous generators, whose rotating field windings are designated by $R_1$, $R_2$, $R_3$ and $R_4$ respectively. These are connected to a source of exciting current such as a battery B. The exciting circuit of the machine $ZM_4$ includes an intermediate frequency alternator MG providing, e. g., an initial frequency of 500 cycles. Thus, in the armature winding of $ZM_4$, two frequencies will be produced of 450 and 550 cycles respectively. These may be employed to transmit two different signals or to effect two different distant controls. Both these frequencies are furthermore employed to excite, in a manner similar to machine MG, two additional machines $ZM_1$ and $ZM_2$ respectively. To this end, a transformer $T_3$ is provided, with its primary connected to the network, and its secondary connected to the exciting circuits of machine $ZM_1$ and $ZM_2$. Each of these exciting circuits of machines $ZM_1$ and $ZM_2$ is in series with filter circuits containing an inductance and capacity in series tuned to the respective frequency. In this manner, four further frequencies will be obtained in the power line, i. e., 400, 500 cycles from one machine and 500, 600 cycles from the other. These frequencies in their turn may be employed for the excitation of further synchronous machines. In the example shown, a further machine $ZM_3$ is added, which has an exciting current of 400 cycles superimposed on the direct current excitation. Thus, by an arrangement represented by Fig. 1, six different frequencies ranging from 350 to 600 cycles in steps of 50 cycles will be obtained. AM is a common synchronous motor driving the additional machines $ZM_1$ to $ZM_4$. Also synchronous motors may be employed, as has already been stated above.

According to the arrangement of Fig. 2, a single machine is provided for the production of any number of frequencies. Similar reference characters refer to similar parts as in Fig. 1. The exciting circuit of the auxiliary generator includes again a 500 cycle current source MG. Moreover, there is a number of filter circuits arranged in parallel and tuned to the different frequencies taken from the line and intended to supply the exciting circuit of the synchronous machine. At first, two frequencies of 450 and 550 cycles will be obtained out of the 500 cycles fundamental frequency which are reintroduced into the exciter winding of the same machine. These respective frequencies are then decomposed again. In the case shown, this splitting up is carried out for a frequency band ranging from 350 to 700 cycles in steps of 50 cycles. For this purpose, there are six filter circuits tuned as indicated by numerals in the drawings which must be provided, as may be readily understood.

Instead of superimposing the intermediate frequencies upon the main exciter winding of this machine, special exciter windings may be provided for each or all of the intermediate frequencies.

Having disclosed the principle of our invention, various modifications will be apparent to those skilled in the art. Our invention therefore, is not limited to the specific disclosure, but only by the scope of the following claims:—

1. In combination with an electrical carrier current system for alternating current power lines carrying current of predetermined frequency, means to produce and introduce a plurality of carrier currents of different frequencies into said power line, said means comprising a coupling device having primary and secondary windings moving relative to each other in synchronism with said power frequency, a source of carrier current of definite frequency, means to introduce said carrier current into said primary winding, means for picking out at least one of split frequencies of said carrier frequency produced in said power line through said coupling device, and means for resplitting and reintroducing said split frequency.

2. In combination with an electrical carrier current system for alternating current power lines carrying current of definite power frequency, means for producing and introducing a plurality of carrier currents of different frequencies into said power line, said means comprising a synchronous device having primary and secondary windings moving relative to each other in synchronism with said power frequency, a source of carrier current of a fundamental frequency, means to apply said carrier current to the primary winding of said device, means for picking current of a split frequency of said carrier frequency produced in said system through said device, and further means for reintroducing and resplitting said current of said last frequency.

3. In combination with an electrical carrier current system for alternating current power lines carrying current of definite power frequency, means for producing and introducing a plurality of carrier currents of different frequencies into the power line, said means comprising a synchronous machine having a stator winding and a rotor exciter winding rotating synchronously in respect to said stator field, a source of carrier current of basic frequency, means to apply current derived from said source to said rotor exciter winding, means to consecutively pick out, resplit and reintroduce currents of split frequencies of said basic frequency produced in said power line through said synchronous machine.

4. In combination with an electrical system carrying current of definite frequency, means to introduce current of different frequency into said system, said means comprising inductive coupling windings moving relative to each other in synchronism with said definite frequency, and means for reintroducing currents of split frequencies of said different frequency produced in said system through said coupling windings.

5. In combination with an electrical carrier current system for power lines carrying current of definite power frequency, means for producing and introducing a plurality of currents of different carrier frequencies into the power line, said means comprising a synchronous machine connected to said power line, an exciter winding for said machine, a source of carrier current of a basic frequency, means to supply currents from said source to said exciter winding, and further means including filter circuits for consecutively picking out, resplitting and reintroducing currents of split frequencies produced from said carrier current into the power line through said synchronous machine.

6. In combination with a network carrying currents of a predetermined frequency, means for introducing into said network a plurality of currents having frequencies different from said predetermined frequency, said means comprising a synchronous machine having an exciter circuit, a generator producing a current of a frequency different from said predetermined frequency included in said exciter circuit, and independent means for introducing currents of other split frequencies from said network to said exciter circuit.

7. In combination with a network carrying currents of a predetermined frequency, means for introducing into said network a plurality of currents having frequencies different from said predetermined frequency, said means comprising a synchronous machine having an exciter circuit, a generator producing a current of a frequency different from said predetermined frequency included in said exciter circuit, whereby currents of two split frequencies are superimposed on the network and means including circuits resonant to said superimposed split frequencies for reintroducing currents of said split frequencies into said exciter circuit.

8. In combination with a network carrying currents of a predetermined frequency, means for introducing into said network a plurality of currents having frequencies different from said predetermined frequency, said means comprising a synchronous machine having an exciter circuit, a generator producing a current of a frequency different from said predetermined frequency included in said exciter circuit whereby two split frequencies are superimposed upon said network, other exciter circuits for said synchronous machine, and means for reintroducing currents of said split frequencies from said network into said other exciter circuits.

In testimony whereof we affix our signatures.

WALTER HAHNEMANN.
KARL RATH.